Patented June 16, 1931

1,809,978

UNITED STATES PATENT OFFICE

ALFRED T. LARSON, OF WILMINGTON, DELAWARE, ASSIGNOR TO DU PONT AMMONIA CORPORATION, OF WILMINGTON, DELAWARE, A CORPORATION OF DELAWARE

PROCESS OF PRODUCING HYDROGEN

No Drawing.     Application filed July 21, 1928.  Serial No. 294,596.

This invention relates to the production of hydrogen from steam and carbon monoxide.

Hydrogen may be prepared by the catalytic reaction of steam and carbon monoxide in accordance with the equation:

$$CO + H_2O = H_2 + CO_2$$

In my copending application Serial Number 290,056, filed July 2nd, 1928, I have described catalysts for this reaction containing the elements copper and zinc. I have found that further improvements may be effected in processes of producing hydrogen catalytically from gaseous mixtures of steam and carbon monoxide by employing for the purpose a catalyst consisting of copper, zinc and one or more of the elements comprising the group chromium, tungsten, silicon, vanadium and molybdenum. Catalysts of this character are very active and in addition are characterized by a superior ability to resist the deteriorating effects of high temperature. The high activity of the catalysts, permitting the initiation of the reaction at temperatures as low as 250–300° C., reduces the amount of heat exchange required between incoming and outgoing gases; and their resistance to thermal deterioration, resulting in a prolonged catalyst life, contributes materially to reducing the cost of hydrogen produced by the process. Furthermore, since the catalysts will function at low temperatures and at the same time are not seriously affected by exposure to high temperatures, it is possible to carry on the reaction over a wider temperature range and with less need for strict maintenance of uniform temperature than has been necessary with previous catalysts.

The catalysts may be prepared by various methods suitable for the manufacture of catalytic materials. Thus an intimate mixture of copper oxide, zinc oxide and one or more of the aforementioned oxides to be incorporated therewith may be prepared by triturating, co-precipitating or fusing a mixture of the oxides. The product may then be formed into tablets or granules of suitable size and shape and, if desired, submitted to reduction before the catalyst is used; or, alternatively, the reduction of the catalyst may be carried out in situ by the reaction mixture of steam and carbon monoxide. The catalysts may also be prepared from the elements themselves; for example, finely divided mixtures of the metals, or powdered alloys thereof, may be formed into pellets, these preferably being activated by alternate oxidation and reduction prior to actual use. Similarly, suitable mixtures of the catalytic elements may be prepared by ignition of mixtures of salts thereof, such as the nitrates, carbonates, oxalates, etc., and by other methods adapted for the preparation of a body of material containing copper in relatively intimate association with zinc and one or more of the elements chromium, tungsten, silicon, vanadium and molybdenum. It has been my experience, however, that generally speaking the best results are obtained in the practical manufacture of hydrogen, and especially when operating at pressures in excess of atmospheric, if the catalysts are prepared in a form in which copper and/or zinc are combined as a salt of an oxide of the third constituent. Thus, I may use a catalyst consisting of copper zinc chromate; copper oxide and zinc tungstate; copper chromate and zinc silicate; copper zinc vanadate; or copper zinc molybdate.

Although the invention is susceptible of wide variation in the manner of its application to the manufacture of hydrogen, both with respect to the specific proportions and conditions used in preparing the catalysts as well as the details of operation of the process in which they are employed, the following examples will serve to illustrate how the invention may be practiced:

*Example 1.*—To a dilute solution containing one mole of copper sulfate and two moles of zinc sulfate add a solution containing three moles of ammonium chromate. Add some ammonium hydroxide to complete the precipitation. Wash the precipitate until practically free from ammonium sulfate, filter the copper zinc chromate mixture, dry the filter cake at approximately 100° C. and crush it into particles of suitable size.

*Example 2.*—To a dilute solution containing approximately equimolecular proportions of the nitrates of copper and zinc add two equivalents of ammonium molybdate. Now add dilute ammonia until the metals have been completely precipitated. Wash the precipitate repeatedly by decantation. Remove the major portion of the water by filtration, dry the precipitate in an oven at about 100° C., and break the dried product into fragments of suitable size.

*Example 3.*—Ignite a mixture comprising equal moles of copper nitrate, zinc nitrate and ammonium vanadite. When the mixture hase been decomposed allow the mass to cool and crush to suitable size.

*Example 4.*—Melt together sixty parts by weight of cupric oxide, thirty-five parts of zinc oxide and five parts of tungstic oxide. Cool and crush to suitable size.

*Example 5.*—To a dilute solution containing about equimolecular proportions of copper and zinc nitrates add a dilute solution of sodium silicate until precipitation is complete. Wash the precipitate by decantation until substantially free from sodium salts. Filter, dry the filter cake at about 100° C. and break into particles of suitable size.

*Example 6.*—Melt a mixture of 50 parts by weight of cupric oxide, 35 parts by weight of zinc oxide and 15 parts by weight of chromium oxide, allow to cool and crush to suitable size.

*Example 7.*—Mix intimately 45 parts of powdered copper, 45 parts of powdered zinc and 10 parts of powdered vanadium. Compress into pellets in a tableting machine.

In each of the foregoing examples the catalyst is preferably subjected to reduction before use by treatment with a current of hydrogen at a temperature within the range of 100–300° C.; however, the reduction may also be effected in situ by means of the reaction mixture of steam and carbon monoxide. In manufacturing hydrogen the catalyst chosen for the purpose is disposed in a suitable reaction apparatus through which there is passed a mixture of steam and carbon monoxide, preferably in a volume ratio of at least 1.5:1, and preliminarily freed from sulfur compounds and other substances deleterious to the catalyst. The carbon monoxide is preferably a commercial gas, water gas for example, containing upwards of 20% by volume of carbon monoxide. The reaction may be carried out at atmospheric pressure or at pressures in excess of atmospheric, for example pressures of from 10 to 100 atmospheres. The temperature employed will depend upon the catalyst, the composition of the raw materials and the desired composition of the reaction products. It must be sufficient to effect the desired reaction. Temperatures of 250–300° C. and upward to 600° C. or higher give satisfactory conversion. The reaction products are cooled to condense excess steam and, to obtain pure hydrogen, are treated by known methods for removing carbon dioxide and small amounts of unconverted carbon monoxide.

I have no explanation or theory to offer as to changes that may take place in the catalysts herein described, either during their preparation or actual use. It is well known that, while materials of known form and composition may initially be introduced into the reaction apparatus as catalyst, the exact chemical state in which they exist during reaction cannot readily and definitely be ascertained. Consequently, in the claims the term element is used to designate the several constituents of the catalysts in either free or chemically combined state; and the term oxide as applied to the various constituents includes the oxide as such or in chemical combination with one or more other elements.

The process herein described may be used in the manufacture of hydrogen from carbon monoxide gases obtained from a variety of source, and is particularly useful when applied to gases containing high concentrations of carbon monoxide, e. g. upwards of 20% by volume of carbon monoxide, as for example gases obtained by the direct oxidation of carbonaceous fuel or as a by-product from such operations as the manufacture of metals or metallic carbides from metallic oxides and carbon.

Various changes may be made in the method herein described without departing from the invention or sacrificing any of the advantages thereof.

I claim:

1. The process of producing hydrogen which comprises causing steam and carbon monoxide to react according to the equation $$H_2O + CO = H_2 + CO_2$$

in the presence of a catalyst containing the elements copper, zinc and one of the elements selected from the group consisting of chromium, tungsten, silicon, vanadium and molybdenum.

2. The process of producing hydrogen which comprises submitting a mixture of steam and carbon monoxide, at a temperature in excess of about 300° C., to the action of a catalyst containing the elements copper, zinc and one of the elements selected from the group consisting of chromium, tungsten, silicon, vanadium and molybdenum.

3. The process of producing hydrogen which comprises submitting a mixture of steam and carbon monoxide, at a pressure exceeding atmospheric and a temperature sufficiently elevated to effect the reaction $$H_2O + CO = H_2 + CO_2,$$

to the action of a catalyst containing the elements copper, zinc and one of the elements selected from the group consisting of chromium, tungsten, silicon, vanadium and molybdenum.

4. The process of producing hydrogen which comprises contacting a gaseous mixture of steam and carbon monoxide at reacting temperature with a catalyst containing, in chemical combination with one another, copper, zinc and an oxide of one of the elements selected from the group consisting of chromium, tungsten, silicon, vanadium and molybdenum.

5. The process of producing hydrogen which comprises causing steam and carbon monoxide to react according to the equation $$H_2O + CO = H_2 + CO_2$$

in the presence of a catalyst containing the elements copper, zinc and chromium.

6. The process of producing hydrogen which comprises submitting a mixture of steam and carbon monoxide, at a temperature in excess of about 300° C., to the action of a catalyst containing the elements copper, zinc and chromium.

7. The process of producing hydrogen which comprises submitting a mixture of steam and carbon monoxide, at a pressure exceeding atmospheric and a temperature sufficiently elevated to effect the reaction $$H_2O + CO = H_2 + CO_2,$$

to the action of a catalyst containing the elements copper, zinc, and chromium.

8. The process of producing hydrogen which comprises contacting a gaseous mixture of steam and carbon monoxide at reacting temperature with a catalyst containing, in chemical combination with one another, copper, zinc and chromium oxide.

In testimony whereof, I affix my signature.

ALFRED T. LARSON.